United States Patent [19]

Clifft

[11] 4,346,772
[45] Aug. 31, 1982

[54] POWER ASSISTING DEVICE FOR A MANUALLY OPERATING VEHICLE

[76] Inventor: Dale L. Clifft, 5412 Crebs Ave., Tarzana, Calif. 91356

[21] Appl. No.: 962,964

[22] Filed: Nov. 22, 1978

Related U.S. Application Data

[63] Continuation-in-part of Ser. No. 866,562, Jan. 3, 1978, abandoned.

[51] Int. Cl.³ ............................................. B62M 7/14
[52] U.S. Cl. ...................................... 180/11; 280/204
[58] Field of Search ................... 180/11, 210; 280/204, 280/239

[56] References Cited

U.S. PATENT DOCUMENTS

| 1,165,467 | 12/1915 | Tideman | 180/11 |
| 1,341,379 | 5/1920 | Mauclaire | 180/11 |
| 2,552,846 | 5/1951 | Dinkins | 180/11 |
| 3,312,299 | 4/1967 | Kuecker | 180/11 |
| 3,934,666 | 1/1976 | Ellington | 180/11 |

FOREIGN PATENT DOCUMENTS

| 967288 | 10/1950 | France | 280/204 |
| 1054496 | 2/1954 | France | 280/204 |
| 106003 | 11/1942 | Sweden | 180/11 |
| 13610 | of 1898 | United Kingdom | 280/204 |
| 29345 | of 1913 | United Kingdom | 180/11 |

*Primary Examiner*—Richard A. Bertsch
*Assistant Examiner*—Donn McGiehan
*Attorney, Agent, or Firm*—Jack C. Munro

[57] ABSTRACT

A power assisting device for a manually operated vehicle such as a bicycle which takes the form of a motor which rotationally drives a driving wheel through a centrifugal clutch assembly. The driving wheel is connected through a linkage assembly to the frame of the bicycle with the linkage assembly permitting a limited amount of lateral movement of the power assisting device to avoid skidding of the driving wheel during making of turns with the bicycle. Movements of the power assisting device toward and away from the roadway are to be damped through a motion damper assembly mounted in conjunction with the linkage assembly.

10 Claims, 9 Drawing Figures

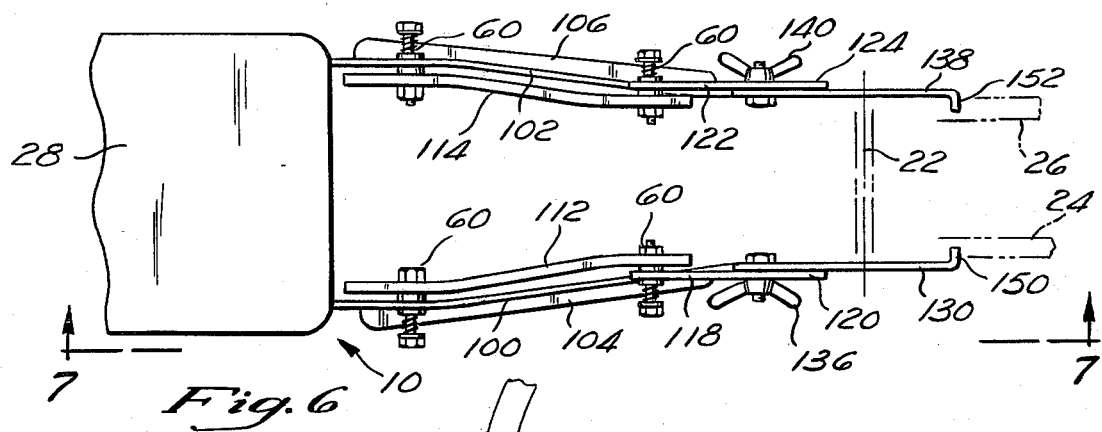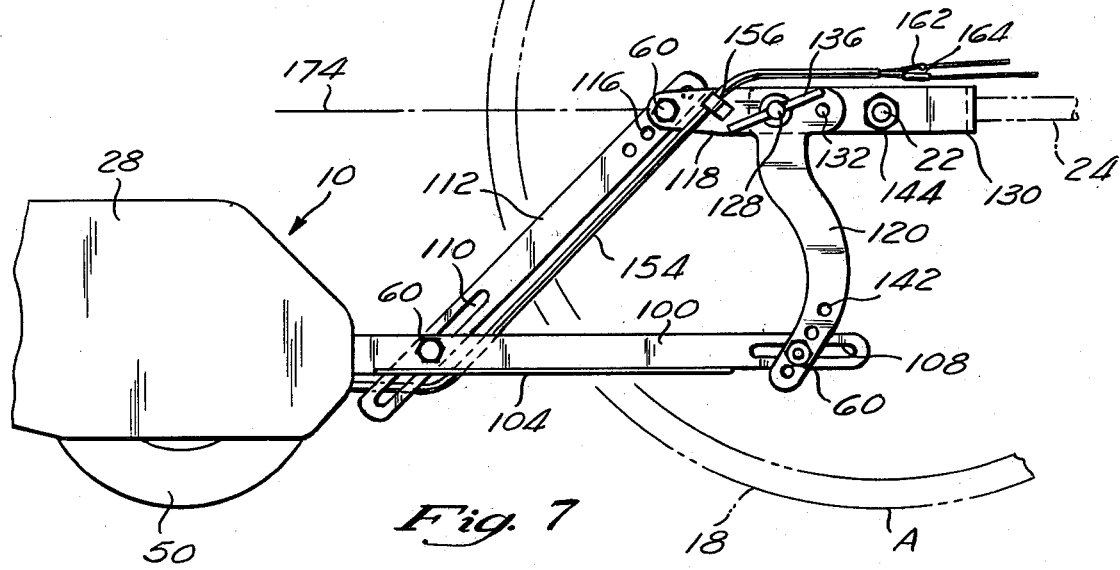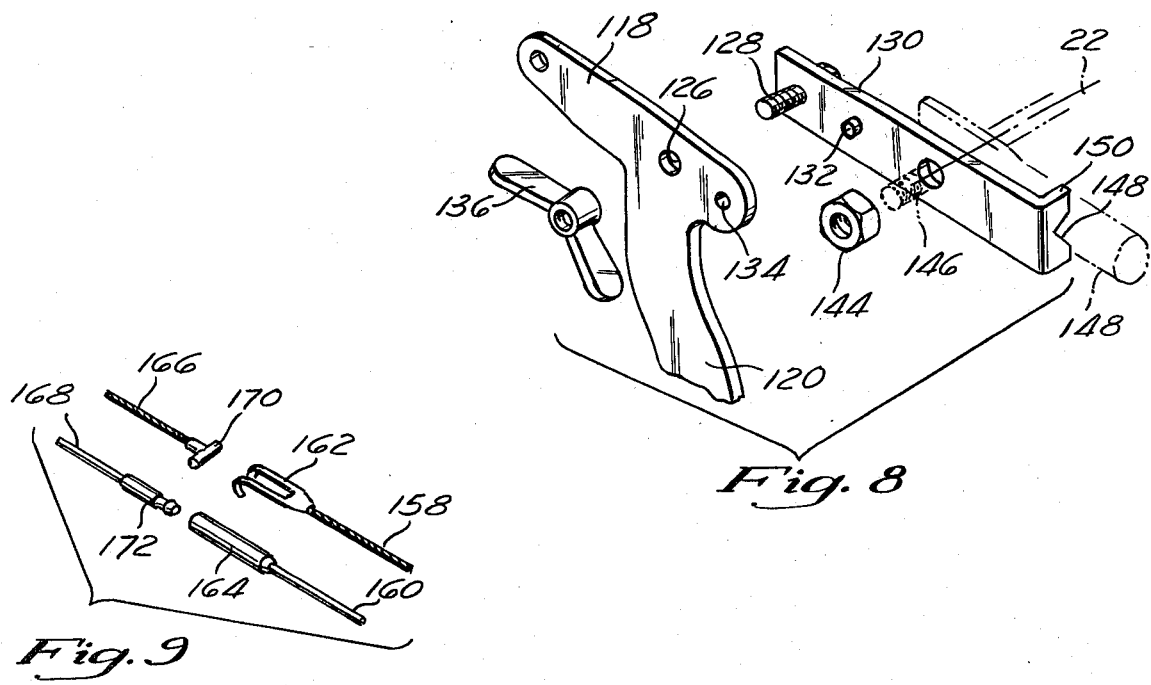

POWER ASSISTING DEVICE FOR A MANUALLY OPERATING VEHICLE

REFERENCE TO A PRIOR APPLICATION

This application is a continuation-in-part of patent application Ser. No. 866,562, filed Jan. 3, 1978, now abandoned, of the same title and by the same inventor.

BACKGROUND OF THE INVENTION

Energy conservation has caused people to rely more on bicycles than on fuel burning vehicles such as motorcycles. However, for a substantial number of people, especially people of middle age or older, the bicycle is difficult to operate as well as being a slow mode of transportation.

In order to overcome the above difficulties of the bicycle, it has been common to construct a lightweight motorcycle which includes a small power assisting motor. These types of lightweight motorcycles are generally referred to as "Mopeds". The vehicle is manually operated through a series of peddles, similar to a bicycle, with the motor for the purpose of adding additional power. A "Moped's" speed is usually limited to less than 30 miles per hour which is usually adequate speed for short distance traveling.

At the present time, for one that has a bicycle and that person wishes to acquire a "Moped", that person must buy another separate vehicle. It would be most desirable to provide at a substantially lower cost a power assisting device which would accomplish the objectives of the "Moped", which would be mounted in conjunction with the bicycle thereby eliminating the need for the purchase of a completely separate vehicle.

SUMMARY OF THE INVENTION

The power assisting device of this invention takes the form of a motor which operates to drive a driving wheel through a centrifugal clutch assembly. The motor is located aft of the driving wheel which permits mounting of the wheel closer to the rear wheel of the manually operated vehicle (bicycle) to achieve a tighter turning radius. Additionally, the placing of the motor aft of the driving wheel causes a portion of the weight of the bicycle to be transferred to the driving wheel for increased traction. Additionally, because the motor is located substantially in horizontal alignment (aft) with the driving wheel, the entire power assisting device assumes a low profile, that is located as near the ground as possible which substantially increases handling of the bicycle. The line of force of the power assisting device of this invention is located very near the point of contact with the ground of the trailing wheel of the bicycle. This invention has eliminated undesirable forces on the bicycle during the making of turns so that such are no longer detectable to the bicycle rider. In other words, during the making of turns, lateral forces on the bicycle are felt when thrust is applied from the power assisting device. Lateral forces on the bicycle result in two distinct undesirable characteristics. The first undesirable characteristic results in a tendency to tip the bicycle on its side when thrust is applied high above the ground. The second undesirable characteristic occurs when the point of thrust is significantly forward or significantly aft of the contact point of the bicycle trailing wheel to the ground. Lateral force applied significantly forward or aft of the bicycle trailing wheel axle results in understeer or oversteer, respectively. This lateral force is also felt by the bicycle rider at the handlebars because of the forward sloping rake angle of the forward wheel steering pivot. Unnatural handle bar forces cause handling difficulty for the bicycle rider. This invention has located the power assisting device point of thrust to the bicycle slightly aft of the trailing wheel alsl to counteract for the thrust being applied off the bicycle fore and aft centerline during the making of turns. In other words, during a turn, the forward thrust produces a directional torque (depending whether it is a right or left turn) and this torque is essentially cancelled by the locating of the point of thrust aft of the bicycle rear wheel axle which therefore produces a counter torque. Thus, this invention incorporates handling improvements by applying the power assisting device thrust near the contact point of the bicycle trailing wheel with the ground with compensation for the off center thrust inherent in the dual member linkage arrangement of the linkage assembly. The power assisting device is connected through a linkage assembly to the bicycle and specifically is connected to the rear axle area of the bicycle. The linkage assembly includes a break-away feature so if the bicycle or the power assisting device encounters an unusually large unexpected force, such as encountering a chuckhole or a curb, the power assisting device will automatically be disconnected from the frame of the bicycle to prevent damage to the frame of the bicycle. The linkage assembly is to include adjustment means to facilitate attachment of the power assisting device of this invention to different sizes of bicycles. The linkage assembly permits a limited amount of lateral movement of the power assisting device to minimize skidding of the driving wheel during making of turns with the bicycle. A bounce control is included to damp expected, small movements of the power assisting device toward and away from the roadway. A quick disconnect cable assembly is mounted between the handle bars of the bicycle and the power assisting device in order to control the throttle of the engine of the power assisting device.

The primary objective of this invention is to construct a power assisting device which can be readily attached and detached from a conventional bicycle thereby permitting the bicycle to be used solely as a bicycle or as a power assisted bicycle.

Another advantage of this invention is that the power assisting device outperforms the "Mopeds" in acceleration and hill climbing due to the lighter weight of the total machine.

Another advantage of this invention is that the power assisting device permits normal operation of the bicycle even with the power assisting device inoperative.

Another advantage of this invention is that the power assisting device is substantially more economical to purchase than a "Moped".

Another advantage of this invention is that the device is located separate from the bicycle which means there is no altering of the bicycle frame which could cause weakening of the frame nor is the bicycle subject to vibration or contamination by gasoline and oil. Another advantage is that the bicycle has a higher silhouette in traffic than a "Moped", therefor safer.

Another advantage of this invention is that an extremely lightweight engine can be employed (approximately six pounds) which is still capable of supplying sufficient torque to operate the bicycle at speeds in excess of thirty miles per hour on a slight upgrade. By mounting of the engine aft of the wheel, some portion of the weight of the bicycle is transferred to the driving wheel to help provide sufficient traction due to the loss in traction created in the use of the light weight engine.

Another advantage of this invention is that the linkage assembly attaching the power assisting device to the frame of the bicycle is to break-away from the frame of the bicycle if the bicycle or the power assisting device incurrs some unexpected force from hitting a large bump or hole. This break-away feature is to prevent damage to the frame of the bicycle at the connection of the power assisting device to the frame of the bicycle.

Another significant advantage of this invention is that the line of force from the power assisting device is located very near a point of contact of the rear wheel of the bicycle with the ground. This minimizes the effect of oversteering of the bicycle during the making of turns of the bicycle and therefor is to prevent or minimize the possibility of tipping of the bicycle during a turn. In other words, significantly improved handling is achieved by the locating of the line of force so near the point of contact with the ground of the rear wheel of the bicycle.

Another advantage of this invention is that because the entire power assisting device is located so near the ground, actually entirely below the line interconnecting the front and rear axle of the bicycle, that significantly improved handling of the bicycle is achieved during operation of the power assisting device.

Another advantage of this invention is that by the use of a damper assembly that bounce is controlled, sideways oscillation is controlled and bicycle vibration is minimized.

BRIEF DESCRIPTION OF THE DRAWING

FIG. 6 is a top plan view of a modified form of linkage assembly interconnecting the power assisting device of this invention with the frame of a bicycle;

FIG. 7 is a side elevational view taken along line 7—7 of FIG. 6;

FIG. 8 is an exploded isometric view showing the interconnection of the linkage assembly to the rear axle area of the bicycle; and FIG. 9 is a segmental isometric view showing the quick disconnect of the engine throttle cable arrangement employed in conjunction with this invention.

DETAILED DESCRIPTION OF THE SHOWN EMBODIMENT

Figure 1:
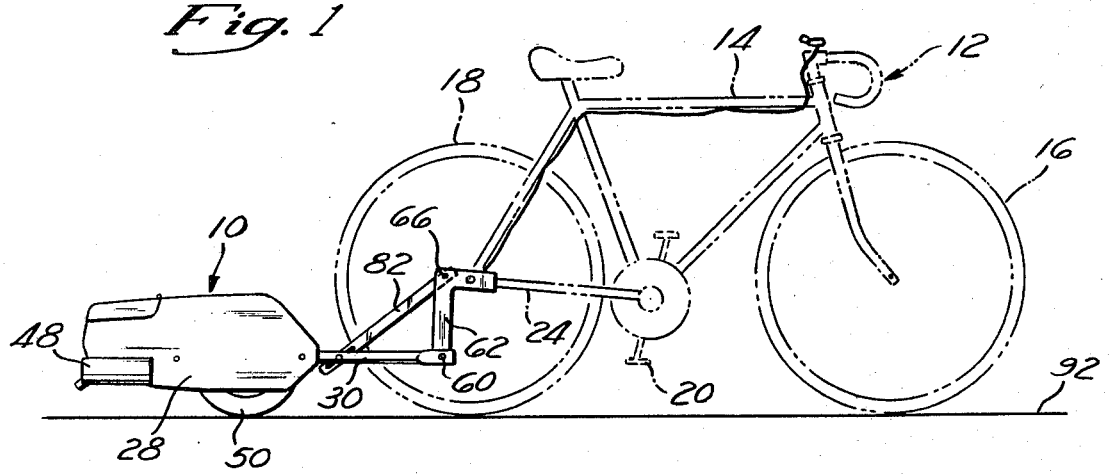
FIG. 1 is a side elevational view of the power assisting device of this invention showing such being mounted in conjunction with the standard bicycle.
Figure 2:
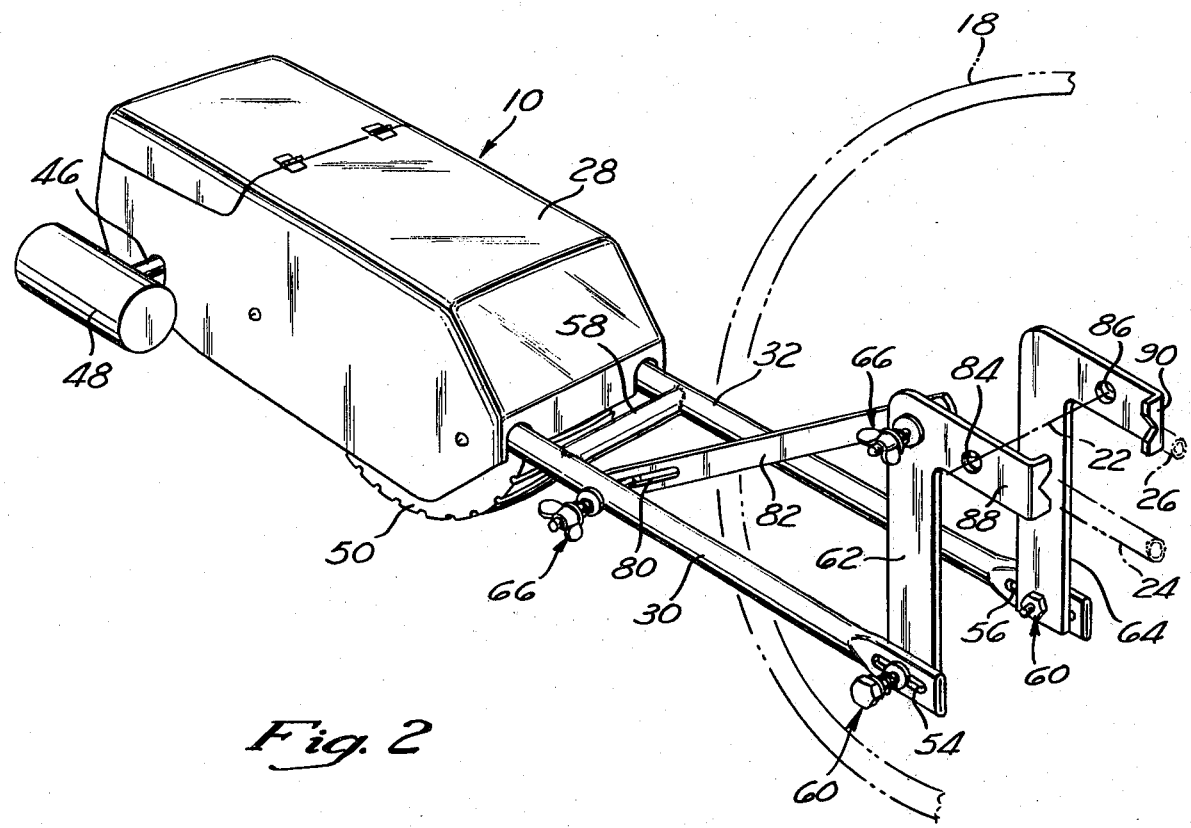
FIG. 2 is an isometric view of the power assisting device of this invention showing how such is attached to the rear wheel of the bicycle.
Figure 3:
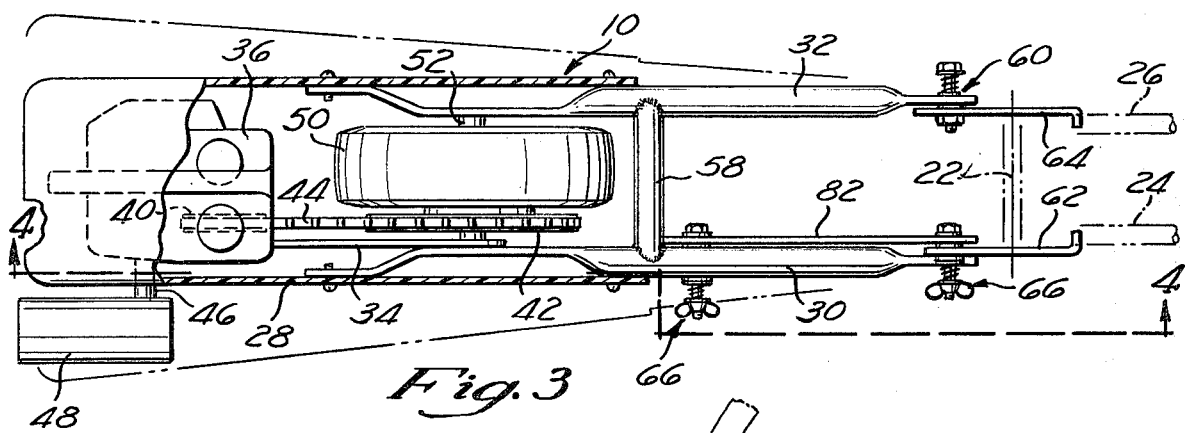
FIG. 3 is a top plan view of the power assisting device of this invention with the housing of the device being partially cut away for the purposes of illustrations.
Figure 4:
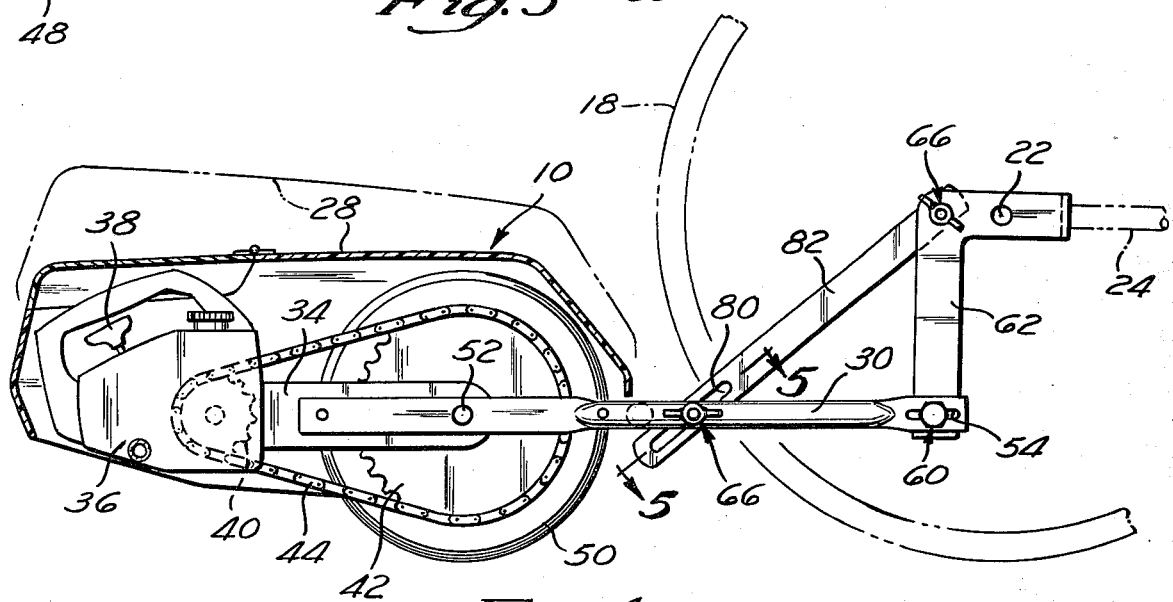
FIG. 4 is a partial cross-sectional view taken along line 4—4 of FIG. 3.

Referring particularly to the drawings, there is shown the power assisting device 10 of this invention which is to be mounted in conjunction with a conventional bicycle 12 for the purpose of decreasing the physical effort required to move the bicycle and increase the distance one may travel avoiding fatigue. The bicycle 12 is deemed to be conventional having a frame 14, a leading wheel 16, a trailing wheel 18 and a pedal assembly 20. The trailing wheel 18 has a rotational axis 22. The frame 14 includes a pair of spaced lower support members 24 and 26 which connect with the trailing wheel 18.

The power assisting device 10 includes an exterior housing or cover 28 which is to be attached to a pair of spaced apart elongated members 30 and 32. The member 30 is fixedly secured to a lower support member 34 upon which is fixedly mounted the motor 36. The motor 36 can take the form of any type of small sized gasoline or electric operated engine. A preferable type of motor would be what is employed in confunction with a chain saw that is 2.3 cubic inches in size.

The motor 36 is to be started through the use of a pull cord 38 and rotates a sprocket 40 which in turn drives a driven sprocket 42 through a chain 44. Exhaust gas from the motor is transmitted through exhaust pipe 46 to the ambient through a muffler 48.

The driven sprocket 42 is fixed to a driving wheel 50. The driving wheel 50 is rotationally mounted by means of an axle 52 between the members 30 and 32.

The free end of the member 30 includes an elongated slot 54. A similar slot 56 is formed in the free end of the member 32. It is to be noted that the members 30 and 32 are fixedly connected together through a brace 58 and are located in a evenly spaced apart parallel configuration. A pin fastener assembly 60 is employed in conjunction with the slot 54 with the fastener assembly 60 comprising an adjustable frictional breaking device which will be described further on in relation to FIG. 5. A similar fastener member 60 is to be employed in conjunction with slot 56.

The fastener member 60 is to connect together member 30 and upright member 62. The other fastener assembly 60 is to interconnect together the member 32 and a second upright member 64. The members 62 and 64 are located in a mirror image relationship closely spaced apart. The trailing wheel 18 of the bicycle is located between the members 62 and 64 as well as between the members 30 and 32.

Figure 5:
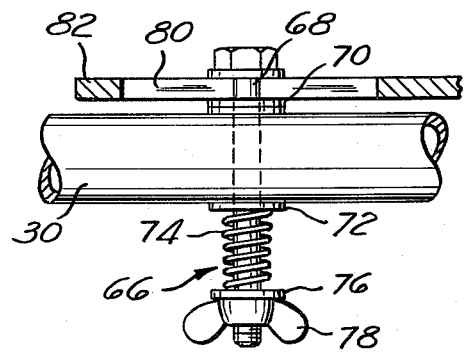
FIG. 5 is a cross-sectional view taken along line 5—5 of FIG. 4.

Referring particularly to FIG. 5 there is shown a fastener assembly 66 which comprises a threaded bolt 68, washers 70 and 72, a spring 74, a washer 76 and a wing nut 78. Bolt 68 is conducted through an elongated slot 80 formed within an arm member 82. It can be seen by tightening up the wing nut 78, the spring 74 is compressed which in turn exerts a binding force on both of the members 82 and 30. This binding force is selected so as to permit movement between the members 30 and 82 and yet requiring a certain force level to be obtained prior to permitting movement. In other words the fastener assembly 66 functions as a frictional drag.

Since the fastener assemblies 60 are basically identical to the fastener assemblies 66 (substituting a hexagonal nut for the wing nut 78), movement between the member 30 and the member 62 is permitted as well as movement between the member 32 and the member 64. This movement is limited in the longitudinal direction of the slots 54 and 56. The reason for this movement is that as the bicycle 12 is navigated around turns, it is not desired to have the wheel 50 to slip sideways. In order to avoid this, the members 30 and 32 move slightly with respect to their members 62 and 64.

The members 62 and 64 include openings 84 and 86, respectively, which connect with the axle of the trailing wheel 18 of the bicycle. Actually, the members 62 and 64 are to be fixed to the axle of the trailing wheel 18.

The member 62 includes an extension 88 with the member 64 including a similar extension 90 which are attached to members 24 and 26 respectively. As a result a secure interconnection of the power assisting device 10 is obtained through the use of the members 30 and 32, members 62 and 64 and extensions 88 and 90. The motive force supplied from the power assisting device 10 is located close to the roadway 92 which is desirable from the point of view of handling. Also, it is to be noted that the power assisting device 10 is located very near to the trailing wheel 18 which is of significant assistance in the eliminating of undesirable torques between the device 10 and the bicycle 12.

Inherently, during operation, the device 10 will tend to "bounce" with respect to the roadway 92 due naturally to the uneven conditions of the roadway 92. This motion created by this "bounce" is to be damped and such is accomplished through the inclusion of the member 82 between the members 30 and the member 62. A similar fastener assembly 66 connects the member 82 to the member 62. By adjusting of the member 66, a frictional drag is produced in the pivoting of the members 30 and 32 with respect to the members 62 and 64.

Referring particularly to FIGS. 6–9 of the drawings there is shown a modified form of linkage assembly which is to interconnect the power assisting device 10 to the bicycle frame support members 24 and 26. The linkage assembly of FIGS. 6–9 is basically similar to the linkage assembly described in relation to FIGS. 1–5 and is to operate in precisely the same manner. The primary distinction of the linkage assembly within FIGS. 6–9 is that it is adjustable so that the power assisting device 10 can be connected to different sizes of bicycles. Additionally, the linkage assembly is designed to be more readily attachable and detachable from a bicycle so as to facilitate quick and easy connection to and disconnection from the bicycle.

Within FIGS. 6–9, the elongated members 30 and 32 are shown to comprise flat or planer members 100 and 102. The members 100 and 102, as is apparent within FIG. 6, are each slightly bent in an inward direction so that the linkage assembly very closely conforms to the width of the wheel 18. The member 100 includes a perpendicular flange 104 with the member 102 including a similar perpendicular flange 106. These flanges 104 and 106 are provided for rigidity or strength of the members 100 and 102.

The outer end of the member 100 includes a slot 108. A similar such slot (not shown) is formed within the outer end of the member 102. Adjacent the inner end of the member 100 is an opening which is to accommodate a fastener 60. A similar fastener 60 is mounted within an opening formed adjacent the inner end of member 102. Fastener 60 cooperates within an elongated slot 110 formed within an arm member 112. A similar slot (not shown) is formed within arm member 114 and the other fastener 60 is to cooperate with this slot within the arm member 114.

The outer end of the member 110 includes a plurality of spaced apart apertures 116. Similar apertures (not shown) are formed within the outer end of arm member 114.

A fastener assembly 60 is to cooperate with one of the apertures 116 within the arm member 112. This particular fastener 60 is to connect with extension 118 of the upright member 120. In a similar manner a fastener member 60 is to cooperate within one of several apertures located in the outer end of member 114 and is also to connect with an extension 122 of an upright member 124.

The upright member 120 is to include a bolt receiving opening 126 which is to connect with bolt 128 which is securely fixed to attaching bracket 130. There is also a pin 132 securely mounted to the attaching bracket 130. Pin 132 is to be located within an opening 134 formed within the upright member 120. A wing nut 136 is to connect with the bolt 128 and thereby securely fix the upright member 120 to the attaching bracket 130. It is to be understood that a similar connection arrangement is established with the upright member 124 and the attaching member 138 with only the wing nut 140 being clearly shown.

The lowermost end of the upright member 120 includes a plurality of spaced apart openings 142. Similar types of openings (not shown) are located within the lower end of the member 124. A fastener assembly 60 is to interconnect with a single opening 142 and a slot 108. A similar fastener assembly 60 is to interconnect between members 124 and 102.

The attaching member 130 is securely mounted by means of a nut 144 to shaft 146. The rotational axis 22 constitutes the longitudinal center axis of the shaft 146. The outer end of the attaching member 130 includes a bent-over section 150 with a V-shaped slot 148. A similar bent-over section 152 is formed on the member 138 with this bent-over section including a V-shaped slot (not shown). The nut 144 is tightened sufficiently upon the threaded end of the shaft 146 so that the V-shaped slot 148 tightly engages the member 124. A similar attachment occurs between the member 138 and the member 26. It is to be noted that this same type of connection is established between the members 62 and 64 with the members 24 and 26. Upon the bicycle or the motor assisting device 10 incurring some type of unanticipated force, in order to prevent possible damage to the frame of the bicycle at the point of connection of the motor assisting device 10 with the bicycle frame, the bent-over sections 150 and 152 and their respective V-shaped slots merely disengage from the members 24 and 26. This means that the entire linkage assembly of the motor assisting device is free to pivot about the axis 22 on the shaft 146. Upon such occurring, the operator would then have to loosen the brackets 130 and 138 from the shaft 146, reposition the bent-over sections 150 and 152 in cooperation with the members 24 and 26, and then retighten the nuts such as nut 144 thereby securely reattaching the members 130 and 138 to the bicycle frame. It is to be understood that when it is desired to not use the motor assisting device 10 with respect to the bicycle, the operator only need to disengage the wing nuts 136 and 140 and detach the members 118 and 128 from the attaching members 130 and 138 which thereby frees the motor assisting device 10 from the bicycle. The attaching members 130 and 138 will remain attached to the bicycle.

The purpose of the openings 116 and 142 is so as to facilitate attachment of the motor assisting device 10 to various sizes of bicycles such as a twenty-eight inch, a twenty-six inch, a twenty-four inch and a twenty-two inch bicycle.

It is desired to control the operation of the throttle of the engine within the motor assisting device 10 and, in order to accomplish such, a control cable assembly 154 extends from the engine (not shown) through the housing 28 and is attached to extension 118 by bracket 156. The control cable assembly 154 includes two separate cables 158 and 160. Cable 158 terminates in a bifurcated claw-like member 162. Cable 160 terminates in a female type connector 164. The cable 158 is to control the throttle of the engine and cable 160 is to function as a "engine kill" switch.

Mounted on the bicycle frame are cables 166 and 168. Cable 166 terminates in a T-shaped connector member 170 while the cable 168 terminates in a male connector member 172. The T-shaped member 170 is to be connectable with the claw-like member 162. The male connector 172 is to connect within the female member 164.

The connection between the members 170 and 162 as well as the connection between the members 172 and 164 is to facilitate ease of connection and disconnection. This type of "quick disconnect" is to facilitate attachment and detachment in the shortest possible time of the power assisting device 10 to the bicycle.

It is to be understood that the previous description to the fastener assembly 60 will also apply to the structure shown within FIGS. 6–9 and is to function in the same manner.

It has been discovered that an extremely lightweight engine (approximately six pounds) can be employed to operate the bicycle at better than thirty miles per hour. However, the use of such a lightweight engine diminishes the traction of the wheel 50 upon the ground. In order to increase the traction of the wheel 50, the engine is mounted aft of the wheel 50 as is shown within FIGS. 3 and 4. As a result, the engine weight is transferred to the wheel 50 and also a portion of the bicycle weight is transferred to the wheel 50. In actual practice, it is found that the overall weight through the wheel 50 to the ground (traction weight) is approximately twenty eight to thirty pounds even though the actual weight of the unit is twenty five pounds. Additionally, by locating of the engine rearwardly of the wheel 50, the wheel 50 can be located very near the wheel 18 of the bicycle. This minimizes the creation of undesirable stress on the linkage assembly. Additionally, a tighter turn radius is also achieved.

Another feature of the power assisting device 10 of this invention is that the entire device 10 is located substantially below a line 174 which interconnects the trailing wheel axis 22 with the wheel axis of the front wheel 16. By the locating of the power assisting device 10 in this manner, that is as close to the ground as possible, the creation of undesirable torques are minimized. It is to be noted that the line of force (through members 100 and 102) from the power assisting device 10 is located substantially nearer the point of contact A of the wheel 18 with respect to the ground than the rear wheel rotational axis 22. As previously discussed, this substantially diminishes (actually makes negligible) the tendency for the bicycle to oversteer or tip when making a turn. If the bicycle wheel 18 is twenty-eight inches in diameter, then the distance from axis 22 to point A would be fourteen inches. If the diameter of the wheel 50 is eleven and one-fourth inches, then the distance from the line of force being transmitted through members 100 and 102 to point A is five and five-eighths inches. This means that the line of force being transmitted through members 100 and 102 is approximately only forty percent above the ground of the distance between point A and axis 22.

It is to be noted that if the bicycle encounters a slippery or loose surface (snow, ice, oil, gravel, etc.), the wheel 50 will immediately move laterally and be centered behind the trailing wheel of the bicycle. This self centering feature then removes the lateral thrust on the bicycle which is most desirable on slippery or loose surfaces (increases handling).

What is claimed is:

1. In combination with a vehicle having a plurality of wheels, a frame connecting said wheels, said wheels comprising a leading wheel and a trailing wheel, a power assisting assembly for said vehicle comprising:

a motor;

a driving wheel rotatably driven by said motor, said driving wheel being longitudinally spaced rearwardly of said trailing wheel, said driving wheel connected to a linkage assembly, said linkage assembly being connected to said frame, said linkage assembly including first means for limited lateral adjustment of said driving wheel in respect to said frame during turning movements of said vehicle, and second means connected to said linkage assembly for retarding said lateral adjustment;

said leading wheel and said trailing wheel being rotatably operable within the same plane with said vehicle moving in a straight direction, said driving wheel being rotatably driven within said same plane;

said linkage assembly includes a first pair of elongated members extending from said driving wheel, a second pair of members interconnecting the free end of said first pair of members and said frame of said vehicle; and said first means being located at the connection between said first pair of members and said second pair of members, said first means including a pin capable of limited longitudinal adjustment within an elongated slot with there being a separate said pin and slot for each pair of interconnected said first member and said second member, whereby said separate pin and slot arrangement causes said driving wheel to be centered behind said trailing wheel if the said power assisting device encounters a slippery or loose surface.

2. The combination as defined in claim 1, wherein:

said second means includes a spring biasing means connected with said pin, said spring biasing means being adjustable to vary the amount of biasing force.

3. The combination as defined in claim 2 including:

said driving wheel being capable of a limited amount of bounce movement within said same plane in respect to said wheels, third means to damp said movement of said driving wheel within said same plane.

4. The combination as defined in claim 3 wherein:

said third means comprises an elongated bar interconnected between said first pair of members and said second pair of members, said elongated bar includes an adjustable frictional binding means to frictionally resist movement of said driving wheel within said same plane.

5. In combination with a vehicle having a plurality of wheels, a frame connecting said wheels, said wheels comprising a leading wheel and a trailing wheel, a power assisting assembly for said vehicle comprising:

a motor;

a driving wheel rotatably driven by said motor, said driving wheel being longitudinally spaced rearwardly of said trailing wheel, said driving wheel connected to a linkage assembly, said linkage assembly being connected to said frame, said linkage assembly including first means for limited lateral adjustment of said driving wheel in respect to said frame during turning movements of said vehicle, and second means connected to said linkage assembly for retarding said lateral adjustment;

said leading wheel and said trailing wheel being rotatably operable within the same plane with said vehicle moving in a straight direction, said driving wheel being rotatably driven within said same plane;

said linkage assembly includes a first pair of elongated members extending from said driving wheel, a second pair of members interconnecting the free end of said first pair of members and said frame of said vehicle;

the connection of said second pair of members with said frame of said vehicle including disconnection means for partially disconnecting said second pair of members from said frame upon either said vehicle or said power assisting assembly incurring an unanticipated force which could potentially damage either said vehicle or said power assisting assembly, said disconnection means being pressed in tight contact with said frame during normal operation of said power assisting assembly, upon said power assisting assembly encountering said unanticipated force of sufficient magnitude the said disconnecting means moves relative to said frame becoming separate and spaced from said frame.

6. The combination as defined in claim 5 including:
said power assisting assembly being capable of a limited amount of bounce movement within said same plane in respect to said wheels, a third means to damp said movement of said power assisting assembly within said same plane.

7. In combination with a vehicle having a plurality of wheels, a frame connecting said wheels, said wheels comprising a leading wheel and a trailing wheel, a power assisting assembly for said vehicle comprising:
a motor;
a driving wheel rotatably driven by said motor, said driving wheel being longitudinally spaced rearwardly of said trailing wheel, said driving wheel connected to a linkage assembly, said linkage assembly being connected to said frame, said linkage assembly including first means for limited lateral adjustment of said driving wheel in respect to said frame during turning movements of said vehicle, and second means connected to said linkage assembly for retarding said lateral adjustment; assisting assembly for said vehicle comprising:
a motor;
a driving wheel rotatably driven by said motor, said driving wheel being longitudinally spaced rearwardly of said trailing wheel, said driving wheel connected to a linkage assembly, said linkage assembly being connected to said frame, said linkage assembly including first means for limited lateral adjustment of said driving wheel in respect to said frame during turning movements of said vehicle, and second means connected to said linkage assembly for retarding said lateral adjustment;

said leading wheel and said trailing wheel being rotatably operable within the same plane with said vehicle moving in a straight direction, said driving wheel being rotatably driven within said same plane;

said linkage assembly includes a first pair of elongated members extending from said driving wheel, a second pair of members interconnecting the free end of said first pair of members and said frame of said vehicle;

the connection of said second pair of members with said frame of said vehicle including disconnection means for partially disconnecting said second pair of members from said frame upon either said vehicle or said power assisting assembly incurring an unanticipated force which could potentially damage either said vehicle or said power assisting assembly; and said first means being located at the connection between said first pair of members and said second pair of members, said first means including a pin capable of limited longitudinal adjustment within an elongated slot with there being a separate said pin and slot for each pair of interconnected said first member and said second member, whereby said separate pin and slot arrangement causes said driving wheel to be centered behind said trailing wheel if the said power assisting device encounters a slippery or loose surface.

8. The combination as defined in claim 7 wherein:
said second means includes a spring biasing means connected with said pin, said spring biasing means being adjustable to vary the amount of biasing force.

9. The combination as defined in claim 8 wherein:
said driving wheel being capable of a limited amount of bounce movement within said same plane in respect to said wheels, third means to damp said movement of said driving wheel within said same plane.

10. In combination with a vehicle having a plurality of wheels, a frame connecting said wheels, said wheels comprising a leading wheel and a trailing wheel, a power assisting assembly for said vehicle comprising:
a motor;
a driving wheel rotatably driven by said motor, said driving wheel being longitudinally spaced rearwardly of said trailing wheel, said driving wheel connected to a linkage assembly, said linkage assembly being connected to said frame, said linkage assembly including first means for limited lateral adjustment of said driving wheel in respect to said frame during turning movements of said vehicle, and second means connected to said linkage assembly for retarding said lateral adjustment;

said leading wheel and said trailing wheel being rotatably operable within the same plane with said vehicle moving in a straight direction, said driving wheel being rotatably driven within said same plane;

said linkage assembly includes a first pair of elongated members extending from said driving wheel, a second pair of members interconnecting the free end of said first pair of members and said frame of said vehicle;

the connection of said second pair of members with said frame of said vehicle including disconnection means for partially disconnecting said second pair of members from said frame upon either said vehicle or said power assisting assembly incurring an unanticipated force which could potentially damage either said vehicle or said power assisting assembly; and said first means being located at the connection between said first pair of members and said second pair of members, said first means including a pin capable of limited longitudinal adjustment within an elongated slot with there being a separate said pin and slot for each pair of inerconnected said first member and said second member, whereby said separate pin and slot arrangement causes said driving wheel to be centered behind said trailing wheel if the said power assisting device encounters a slippery or loose surface.

* * * * *